Jan. 10, 1961    R. L. STAADT    2,967,396
HYDRAULIC FLUID PRESSURE OPERATED DEVICE FOR CLUTCHES
Filed Oct. 20, 1958    3 Sheets-Sheet 3

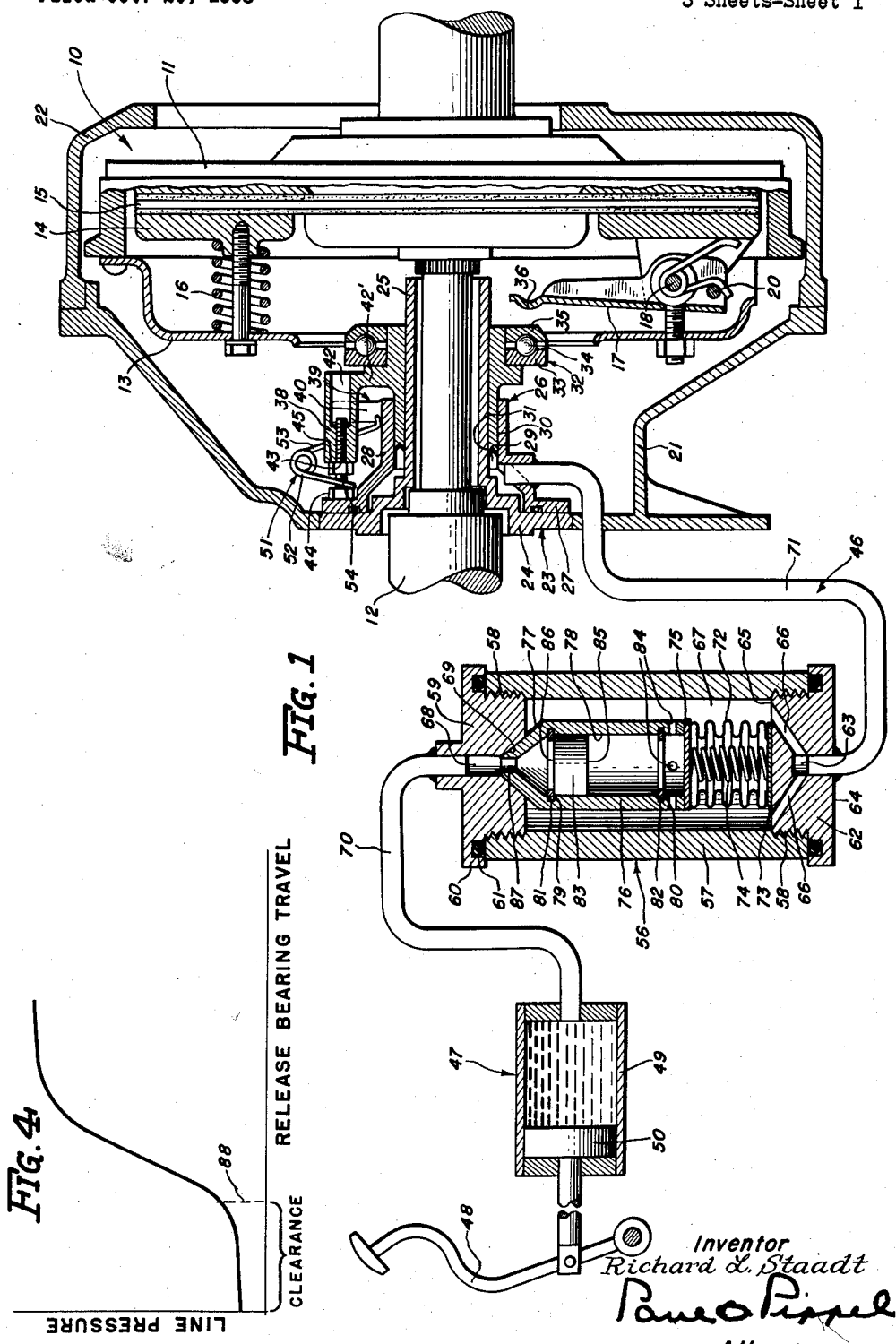

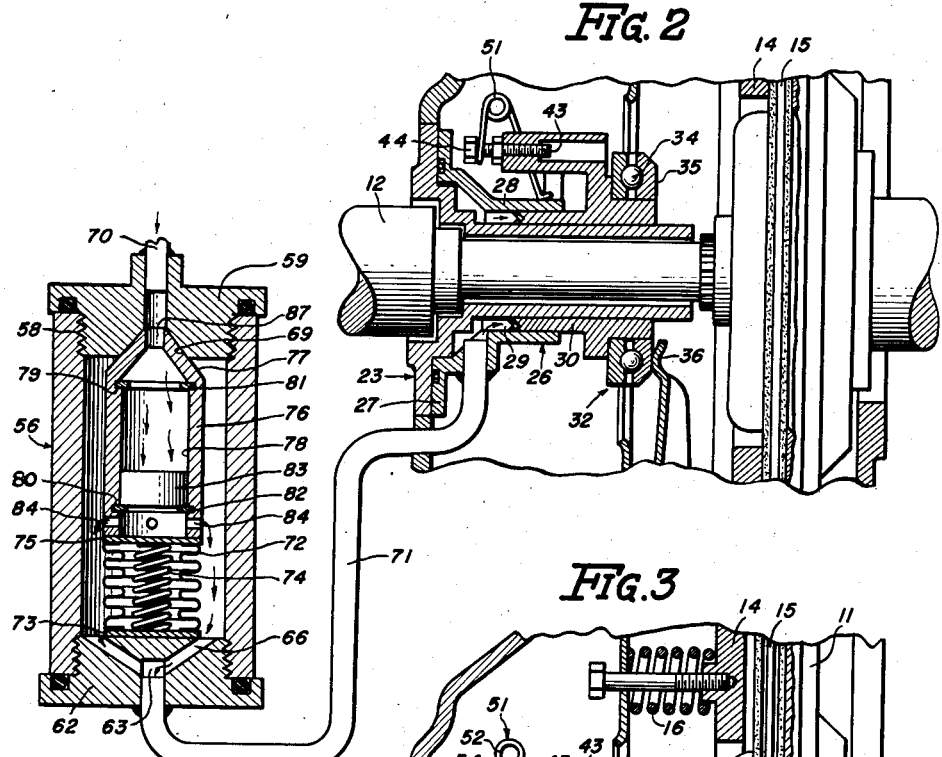

Inventor
Richard L. Staadt
Paul O. Pippel
Attorney

United States Patent Office 2,967,396
Patented Jan. 10, 1961

2,967,396

HYDRAULIC FLUID PRESSURE OPERATED DEVICE FOR CLUTCHES

Richard L. Staadt, Fort Wayne, Ind., assignor to International Harvester Company, Chicago, Ill., a corporation of New Jersey Filed Oct. 20, 1958, Ser. No. 768,445

7 Claims. (Cl. 60—54.5)

This invention relates to hydraulic fluid pressure operated devices for releasing the drive connection between the driving and driven parts of friction-type disk clutch assemblies, and more particularly to a fluid pressure operated clutch actuating device which is automatically self-adjusting to compensate for the wear of the frictionally engaged driving and driven components of the clutch assembly.

Hydraulic fluid pressure operated friction disk clutches to which the present invention relates generally include a plurality of drive and driven friction disk elements which are pressed into engagement with each other by clutch engaging springs for completing the power transmission through the clutch. The clutch release means usually comprises a plurality of circumferentially spaced radially extending levers which are pivotally mounted on a rotating part of the clutch and are constructed and arranged in such a manner that when the inner terminal ends of the levers are moved axially in a particular direction to rock the levers the drive and driven elements are separated with respect to each other against the resilient action of the clutch-engaging springs for releasing the drive through the clutch. One form of power operating mechanism for relatively separating the drive and driven elements of the clutch includes a hydraulic fluid pressure-receiving cylinder and an axially movable power operator actuated by fluid pressure in the cylinder which carries a thrust-transmitting bearing unit adapted to engage the inner ends of the clutch release levers during axial movement of the power operator in a particular direction. The power operator generally is non-rotatable with respect to the clutch release levers and therefore when it is in a position corresponding to the clutch engaged position it is desirable that a predetermined axial spacing or clearance be maintained between the inner terminal ends of the clutch release levers and the thrust transmitting bearing unit. The axial clearance or spacing is provided to limit to a minimum the frictional drag imposed upon the clutch release levers during the clutch engaged phase of operation of the clutch mechanism since the power operator is restrained from relative rotational movement with respect to the clutch release levers. An axial clearance is also desirable to prevent unnecessary wear of the thrust transmitting bearing unit, undue wear of the contacting areas of the clutch release levers and the thrust transmitting bearing unit, and to obviate the possibility of the thrust bearing unit exerting enough pressure on the clutch release levers to partially disengage the clutch and cause relative slipping of the driving and driven clutch elements with a consequent unnecessary accelerated facing wear. Thus only when the clutch is being released as when the thrust-transmitting bearing unit engages the terminal inner ends of the clutch release levers is there a frictional drag imposed upon the levers. This frictional drag is reduced to a minimum by the use of a bearing unit usually of an anti-friction ball or roller type. As the friction facing material provided on the drive and/or driven elements of the clutch wear become thinner when measured in an axial direction the inner terminal ends of the clutch release levers are moved axially toward the thrust-transmitting bearing unit carried by the power operator. It is therefore an important object of the present invention to provide adjusting means for automatically positioning the bearing unit axially with respect to the inner ends of the clutch release levers to insure complete engagement of the drive and driven elements of the clutch assembly and to maintain a predetermined axial spacing or clearance between the inner ends of the clutch release levers and the thrust-transmitting bearing.

Another object of the present invention is the incorporation into a hydraulic clutch actuator of an automatic wear take-up means which functions during the clutch engaging phase of the operation of the clutch and is operable to automatically adjust the clutch assembly for wear by axially positioning the thrust transmitting bearing unit in conformity with the position assumed by the inner ends of the clutch release levers when the clutch is in its fully engaged position.

Still another object of the invention is to automatically position the power operator of a hydraulic fluid pressure clutch actuator with respect to the clutch release means to compensate for the positional change of the clutch release means resulting from wear of the friction elements of the clutch assembly.

The foregoing and other important objects and desirable features inherent in and encompassed by the invention together with many of the purposes and uses thereof will become readily apparent from a reading of the ensuing description in conjunction with the annexed drawings in which:

Figure 1 is a vertical sectional view of the hydraulic fluid pressure operated device in its fully retracted position and the wear take-up means in one operational position as when the device is first installed in a clutch mechanism;

Figure 2 is a view similar to Figure 1 showing the thrust-transmitting unit engaging the inner terminal ends of the clutch release levers;

Figure 3 is a vertical sectional view of the fluid pressure operated device shown in Figure 1 in the position corresponding to the clutch fully released position;

Figure 4 is a curve showing a hydraulic system line pressure plotted against the thrust-transmitting bearing unit travel during the clutch releasing and engaging operation;

Figure 5:
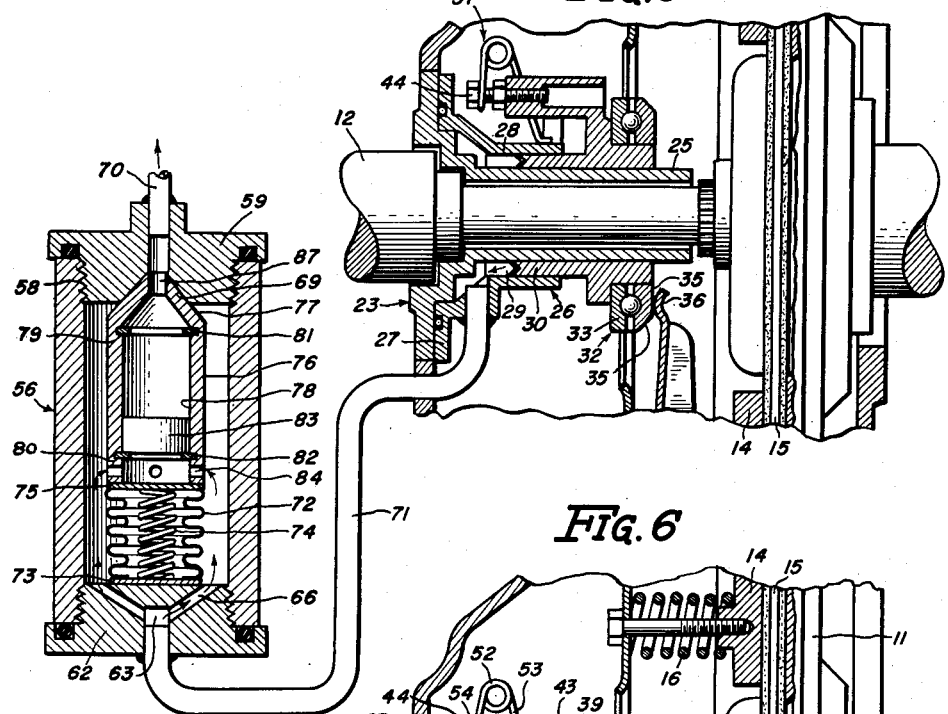
Figure 6:
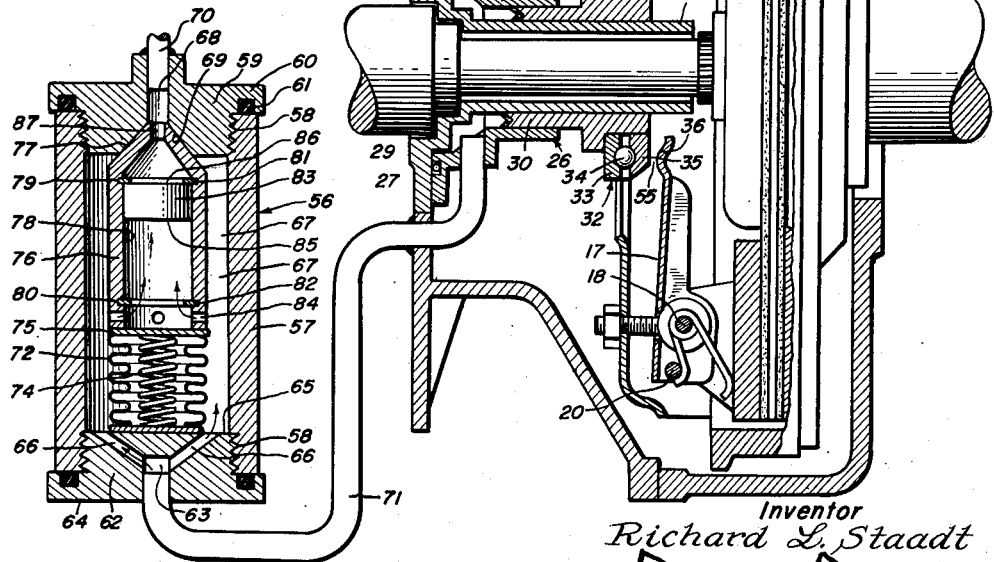

Figure 5 is a view similar to Figure 2 of the fluid pressure operated device at a point where the thrust-transmitting unit is just moving out of engagement with the inner terminal ends of the clutch release levers and the power operator is moving to the left, and Figure 6 is a view similar to Figure 5 showing the power operator in its fully retracted position corresponding to the clutch engaged position.

Referring to the drawings in detail, wherein like reference characters represent like elements throughout the various views the invention is shown incorporated in a motor vehicle clutch and clutch control system. The friction clutch assembly 10 which specifically forms no part of the present invention and is of a well known type currently used commercially includes a drive element or flywheel 11 in which one end of a driven or a transmission input shaft 12 is journalled. A cover plate 13 is mounted on the flywheel 11. Disposed between the flywheel 11 and the covers 13 is an axially shiftable pressure plate 14.

In order to disrupt the drive connection between the flywheel 11 and the driven shaft 12 the flywheel 11 and the driven friction plate 15 are moved out of frictional engagement with each other by moving the pressure plate 14 axially away from flywheel 11 against the biasing action of the clutch springs 16. Such movement of the clutch pressure plate 14 axially away from the flywheel 11 is accomplished by the rocking of a plurality of circumferentially spaced release levers 17 (one of such levers being shown in Figure 1). Each lever 17 is rockably supported by means of a pin 18 which is fastened to the cover plate 13. The relatively short, radially extending part of each lever 17 is provided with a pin 20 which extends through aligned apertures formed in the pressure plate 14 whereby when the radially innermost ends of the lever 17 receive an axial thrust to the right as viewed in Figure 1 to rock the levers 17 above pins 18 the pressure plate 14 is caused to move axially to the left away from the friction rate 15 against the resistance of clutch springs 16 to thereby break the drive connection between the flywheel 11 and the driven shaft 12. When the levers 17 are relieved of such axial thrust the clutch springs 16 shift the pressure plate 14 axially to clamp the driven element 15 to the flywheel 11 to reestablish the frictional drive engagement therebetween.

As in conventional power trains utilized in motor vehicles the front wall 21 of the change speed gear mechanism (not shown) is attached to the clutch bell housing 22 and serves as a rear cover therefor. The driven shaft 12 which is in reality the input shaft to the change speed transmission is journalled in bearings (not shown) mounted within the transmission housing, one of such bearings (not shown) being provided adjacent a point where the shaft 12 extends through the wall 21. A bearing cover 23 is suitably fastened to the wall 21 and encircles the shaft 12 as shown in Figure 1. The bearing cover 23 includes a radially extending flange portion 24 integrally formed with an axially extending sleeve-like section 25 through which the driven shaft 12 extends.

The fluid pressure operated actuating device for rocking the clutch lever 17 about pins 18 to release the driven element from frictional drive engagement with the flywheel 11 includes the front bearing cover 23 of the change speed transmission. The device also includes a cylindrical member 26 arranged concentrically with respect to the bearing cover 23. The cylindrical member 26 includes a radially extending flange 27 which abuts the radially extending flange 24 of the bearing cover 23. The cylindrical member 26 is suitably fastened to the bearing cover 23 by suitable means such as cap screws, not shown, which extend through the abutting flanges 24 and 27. Flange 27 is provided with an annular groove in which a sealing ring is enclosed for sealing the abutting surfaces of the flanges 24 and 27. Integrally formed with and extending axially away from the flange 27 is a tubular section 28 which is arranged concentrically with the sleeve-like section 25 but is radially spaced outwardly therefrom to provide a fluid pressure receiving chamber 29.

From the foregoing it will be appreciated that the fluid pressure receiving chamber 29 is closed at one end in a fluid tight manner and has its opposite end open. A sleeve-like piston 30 is mounted on the sleeve section 25 and is adapted to slide axially and have one end thereof slidingly engaging the surfaces of the sections 28 and 25 partially defining the fluid receiving cylinder 29. A ring of resilient material 31 having a substantially V-shaped cross section is provided on the end of the piston sleeve 30 movable within the cylinder or chamber 29 to prevent fluid leakage between the surface of the piston sleeve and the engaged surfaces of the tubular section 28 and the sleeve section 25.

An anti-friction bearing unit designated generally by numeral 32 includes an inner race 33 which is press fitted onto the end of piston 30 adjacent the clutch release levers 17. The thrust-transmitting bearing unit 32 includes a plurality of balls 34 and an outer race 35 which is adapted to engage the innermost terminal end portions 36 of the clutch release lever 17 during release of the drive through the clutch mechanism and rotates with the clutch release lever 17 relative to the inner bearing race 33.

The piston 30 is restrained from rotating by means of keyed parts which are formed on the end of the tubular section 28 of member 26 and a cylindrical portion 38 integrally formed with the piston 30. Guide means carried by the tubular section 28 includes a radially extending ear 39. Integrally formed on the end of the tubular section opposite the flange 27 the ear 39 is provided with a radially extending slot having its outermost end open and the side walls of the slot being defined by parallel surfaces 40 (only one of which is shown in Figure 1). The cylindrical portion 38 is connected to the piston 30 by means of an integrally formed radially extending flange 42'. The longitudinal axis of the cylindrical portion 38 is spaced from and is parallel to the rotational axis of the driven shaft 12. The cylindrical portion 38 is adapted to extend through the slot and the diameter of the outer peripheral surface thereof is slightly less than the spacing between the vertical surfaces 40 defining the slot. It will be appreciated therefore that the piston 30 is guided while moving axially and also is prevented from rotating with respect to the tubular section 28 by means of cooperating surfaces of the cylindrical portion 38 and the ear 39. The cylindrical portion 38 is provided with a central bore 42, one end portion of which is provided with internal threads for receiving one end of a stop bolt 43. The opposite end of the stop bolt 43 is provided with an enlarged head 44 which is adapted to abut the flange 27 as shown in Figure 1 to positively limit and establish the maximum retracted position of the piston 30 with respect to the member 26. The maximum retracted position of the piston 30 may be varied slightly by first loosening the lock nut 45 threaded on the end of the stop bolt 43 and normally abutting the end face of the cylindrical portion 38 sufficiently to permit rotation of the stop bolt with respect to the cylindrical member. Thus to move the piston 30 to the left axially as viewed in Figure 1 stop bolt 43 is rotated in the direction to thread the same into the cylindrical portion 38 to shorten the distance between the enlarged abutment head 44 and the end of the cylindrical member 38. After the desired adjustment is obtained the lock nut 45 is tightened against the cylindrical portion 38 to maintain the adjustment of the stop bolt 43. Hydraulic fluid under pressure is introduced to the fluid pressure receiving chamber cylinder 29 through a pipe 46 which has one end connected to and extending through the member 26. Operating pressures are imparted to the hydraulic fluid by means of a remotely located manually operable master cylinder assembly 47. The master cylinder assembly 47 may be of any conventional type and includes a pivotally supported clutch pedal 48 which when rocked in a clockwise direction as viewed in Figure 1 by the application of pressure by the operator's foot forces hydraulic fluid from the master cylinder 49. One end of the pipe 46 is connected to the master cylinder 49 so that when the clutch pedal 48 is rocked in a clockwise direction the chamber 29 is supplied with fluid under pressure. When the force of the operator's foot is removed from the clutch pedal 48 spring means, not shown, associated with the master cylinder assembly 47 returns the clutch pedal 48 to the position shown in Figure 1 which position corresponds to the clutch engaged position. The force for returning the clutch pedal 48 to its clutch engaged position is primarily derived from the spring means of the master cylinder assembly 47. However, the pressure of the fluid being emitted from the chamber 29 acting upon the master cylinder piston 50 as the clutch release spring 16 acting through the clutch levers 17 move the piston 30 to the left as viewed in Figure 1 also creates a force acting upon the clutch pedal 48 tending to move the clutch pedal to its clutch engaged position during a portion of the movement of the clutch pedal from its clutch fully released position to its clutch fully engaged position in a manner as will be pointed out hereinafter. It will be appreciated that the springs 16 are only capable of exerting an axial force upon the piston 30 during the relative movement of the driving and driven elements of the clutch assembly 10 from their released position to their fully engaged position or in other words only during the time when the terminal ends 36 of the clutch release levers 17 are in engagement with the outer bearing race 35 of the thrust-transmitting bearing unit 32. Thus the springs 16 only exert pressure on fluid being emitted from the chamber 29 to apply a force on the clutch pedal 48 tending to rotate it toward its clutch engaged position when the terminal ends 36 of the clutch release levers 17 are in engagement with the outer bearing race 35 of the thrust-transmitting bearing unit 32. Axial movement of the piston 30 from the terminal ends 36 of the clutch release levers 17 when the levers are in their clutch engaged positions whereby the outer bearing race 35 is moved out of engagement with the terminal ends 36 of the clutch release levers 17 is accomplished by a spring element 51. It will therefore be appreciated that the spring element 51 effects emission of fluid from the chamber 29 after the clutch springs 16 are incapable of rocking the clutch release levers 17. Spring element 51 is formed from a single piece of material and includes a pair of helically wound sections 52 (only one of which is shown in Figure 1). The end portions 53 are in the form of legs extending from the helically wound sections 52. The terminal ends of the legs are provided with offset projections which engage the ear 39 at the bottom of the slot. The central section 54 of the spring element 51 is in the form of a U-shaped section having the ends thereof integrally formed with a respective helically wound section 52. The central section 54 is adapted to embrace the stop bolt 43 and a bight portion thereof is constructed and arranged to abut the enlarged abutment head 44. From the foregoing it will be appreciated that the spring element 51 biases the piston 30 axially and yieldably urges the enlarged abutment head 44 of the stop bolt 43 axially towards the flange 27.

As stated hereinbefore it is desirable to provide an axial spacing of clearance between the terminal ends 36 of the clutch release levers 17 and the outer race 35 of the thrust-transmitting bearing unit 32. When the clutch levers are in their positions corresponding to the clutch engaged position of the drive and driven elements in order to limit to a minimum the frictional drag imposed upon the inner ends 36 of the clutch release lever 17 during the operation of the clutch mechanism since the clutch release levers 17 rotate with the flywheel 11 while the piston 30 is restrained from rotational movement. Clearance is also desirable to prevent unnecessary wear of the thrust-transmitting bearing unit 32, undue wear of the contacting areas of the clutch release lever 17 and the outer race 35 and to obviate the possibility of the thrust bearing unit 32 exerting enough pressure on the clutch release lever 17 to partially disengage the clutch and cause slipping of the driven disk and unnecessary accelerated facing wear. Thus only when the clutch is being released and the outer bearing race 35 engages the terminal ends 36 of the clutch release lever 17 is there a frictional drag imposed upon the levers. This frictional drag is reduced to a minimum by the anti-friction balls 34. While it is desirable and important to provide the aforesaid axial spacing or clearance between the terminal ends 36 of the clutch release levers 17 and the outer race 35 of the thrust-transmitting bearing unit 32, it is equally important and desirable to limit such axial spacing to a predetermined amount. Since it is important to limit to a minimum the axial travel of the piston 30 during the clutch releasing operation before the outer race 35 of the thrust-transmitting bearing unit 32 engages the terminal ends 36 of the clutch release lever 17 to commence separation of the drive and driven elements of the clutch assembly, an ideal axial spacing of the clearance 55 is shown in Figure 6 between the inner terminal ends 36 of the clutch release levers 17 and the outer bearing race 35 which is great enough to insure complete disengagement of the thrust-transmitting bearing unit 32 when the piston 30 is in its completely retracted position but which is small enough so that the clutch pedal 48 need be depressed or rocked only a short distance before the bearing unit 32 engages the clutch release lever 17. As stated herein before the present invention contemplates means for automatically maintaining the predetermined clearance 55 throughout the operating life of the clutch assembly 10.

As the clutch facings wear and become thinner when measured in an axial direction the innermost terminal ends 36 of the clutch release levers 17 move to the left, as viewed in Figure 1. Consequently to insure complete engagement of the drive and driven elements of the clutch assembly 10 by maintaining a predetermined axial spacing for clearance 55 between the inner ends 36 of the clutch release lever 17 and the outer race 35 of the thrust-transmitting bearing unit 32, it is necessary to move the piston 30 axially to the left into the cylinder or chamber 29. This axial adjustment of the piston 30 with respect to the clutch release lever 17 is made automatically by a pressure responsive device designated generally by numeral 56. The pressure responsive device 56 includes an open ended cylindrical body section 57 having internal threads 58 formed at each end thereof. A top end cap 59 which has a section provided with external threads for cooperation with the internal threads 58 is threaded into the top end of the cylindrical body section 57. As shown in Figure 1 the top cap 59 includes a radially extending angular flange 60 having a groove formed therein in which a sealing ring 61 is disposed. When the top cap 59 is threaded tightly on the end of the body section 57 the sealing ring 61 cooperates with the flange 60 and the end of the body section 57 to seal the upper end of the body section 57 in a liquid-tight manner. In a similar manner a lower end cap 62 is fastened to the bottom of the cylindrical body section 57 and seals the lower end of the body section in a fluid-tight manner. As best shown in Figure 1, the bottom end cap 62 provided with a central vertical recess 63 which extends from the lowermost surface 64 to a point vertically spaced from the uppermost surface 65 thereof. Extending radially and upwardly from the recess 63 are a plurality of inclined passages 66 which open into the interior space 67 of the device 56. The top end cap 59 is provided with a central vertical bore 68. The lower end of the top end cap 59 is counterbored as shown in Figure 1 to provide a frusto-conical surface 69, the purpose of which will be apparent presently. One section 70 of the pipe 46 leads from the master cylinder 49 to the central bore 68 to establish fluid communication between the interior of the master cylinder and the interior 67 of the control device 56. In a similar manner a section 71 of pipe 46 is in fluid communication with the interior of the fluid pressure receiving chamber 29 and the interior 67 of the control device 56.

Disposed within the interior 67 of the cylindrical body section 57 is an evacuated bellow 72. The bellow 72 includes a bottom plate 73 which abuts and is suitably secured to the surface 65 of the end cap 62. A helically wound compression spring 74 is disposed within the bellow 72 and has one end abutting the bottom plate 73 and its opposite end reacting against an upper plate 75 of the bellows. The bellow 72 is evacuated to minimize the effects due to changes in temperature on the operation thereof. The upper end plate 75 of the bellows 72 is fastened to and closes the open end of an open end hollow valve member 76. The closed end of the valve member 76 is in the form of a cone and the outer surface 77 thereof is adapted to bear against the surface 69 formed in the top end cap 59 when the bellow 72 is expanded as shown in Figure 1. From the foregoing it will be appreciated that when the bellow 72 is collapsed as shown in Figure 3 fluid communication is established between the pipe section 70 and the interior 67 of the control device 56 and conversely when the bellow 72 is expanded and the surface 77 is seated against the surface 69, fluid communication between the interior 67 of the control device 56 and the pipe section 70 is disrupted. The interior surface 78 of the valve member 76 is provided with grooves 79, 80 adjacent each end thereof. A snap ring 81 is expanded into the groove 79 and similarly a snap ring 82 is secured in the groove 80. A disk-like member or plunger 83 slidingly engages the interior surface 78 of the valve member 76 in a sealed relation and is adapted to move vertically between the snap rings 81 and 82 which function as stop means for limiting the movement of the member 83 with respect to the valve member 76. The valve member 76 is provided with a plurality of circumferentially spaced ports 84 below the snap ring 82. Thus the bottom surface 85 of the disk member 83 is continually subjected to the pressure of the fluid in the space 67. Similarly the top surface 86 of the disk member 83 is continually subjected to the pressure of the fluid in pipe section 70 when the valve member 76 is in the position shown in Figure 1 by virtue of a central port 87 formed in the closed end of the valve member and arranged to be in registration with the bore 68 formed in the upper end cap 59.

When the hydraulic fluid pressure operated actuating device is first installed in a motor vehicle, various parts of the clutch assembly 10 and the components of the clutch actuating device and pressure responsive device 56 are in the position illustrated in Figure 1. When in this position the fluid receiving chamber 29, the interior space 67 and the space between the lower surface 85 of the member 83 and the top end plate 75 of the bellows 72 is filled with fluid under pressure slightly above atmospheric pressure and the clutch pedal 48 is in its fully raised position. The pressure within the master cylinder 49 and the pipe section 70 is filled with fluid under atmospheric pressure. It will be noted that the spring 74 is effective to urge the cone surface 77 of the valve member 76 into seating engagement with the frusto-conical surface 69 of the upper end cap 59. In operation, assuming that the clutch assembly and the clutch actuating device are in the engaged position illustrated in Figure 1 as when the device is first installed in the clutch assembly, and it is desired to disrupt the transmission of power between the driven flywheel 11 and the input shaft 12 of the change-speed transmission for the first time, fluid under pressure is admitted into the chamber 29 through the pipe 46 by depression of the clutch pedal 48 by the vehicle operator. As the pedal 48 is rocked from its fully clutch engaged position the piston moves to the right as viewed in Figure 1 and the pressure of the fluid within the cylinder 49 increases. During the first part of rocking movement of the clutch pedal 48 from its clutch fully engaged position toward its clutch fully released position, the fluid pressure in the pipe section 70 which also acts upon the top surface 86 of the disk member 83 reaches a value where it exceeds the pressure of the fluid within the interior space 67 of the pressure responsive device 57, which pressure also is exerted upon the bottom surface 85 of the disk 83. Consequently, the disk member 83 moves from its expanded position, shown in Figure 1, to its contracted position, shown in Figure 2, where it abuts the bottom snap ring 82. The fluid displaced from the interior of the valve member 76 when the disk member 83 moves vertically downwardly from engagement with the upper snap ring 81 to engagement with the lower snap ring 82 flows through the pipe section 71 into the fluid pressure receiving chamber 29. The pressure of the fluid introduced into the chamber 29 acts upon the piston 30 causing it to slide axially to the right, as viewed in Figure 1, into engagement with the inner terminal ends 36 of the levers 17 as shown in Figure 2. Axial movement of the piston 30 from the position shown in Figure 1 to the position shown in Figure 2 where the outer bearing race 35 of the thrust transmitting bearing member 32 makes initial engagement with the inner terminal ends 36 of the clutch release levers 17 is yieldably resisted by the spring 51 which has a very light biasing action as compared to the combined biasing action of the clutch engaging springs 16. Thus in order to advance the piston 30 axially into engagement with the lever ends 36 it is only necessary to overcome the pressure of the fluid within the interior space 67 due to the biasing action of the spring 51, which fluid pressure maintains the disk member 83 against the upper snap ring 81. Thus in order to advance the piston 30 axially into engagement with the lever ends 36 it is only necessary to overcome the biasing action of the spring 51, and since the biasing action of the spring 51 is comparatively small the maximum pressure of the fluid within the chamber 29 is relatively small and substantially constant during this operational phase of the piston 30. However, during this operational phase of the piston 30 the pressure within the pipe section 70 is insufficient to cause collapse or contraction of the bellows 72 by compression of the spring 74. Continued movement of the piston 30 axially to the right by further depression of the clutch pedal 48 by the vehicle operator effects rocking of the levers 17 against the resistance of the clutch springs 16 to withdraw the pressure plate 14 from frictional engagement with the driven element 15 to thus release the driven element from frictional engagement with the flywheel 11. It will be appreciated that with the added resistance of the clutch engaging spring 16 acting upon the piston 30 the fluid pressure within the chamber 29 must be increased over the pressure value existing in the chamber 29 at the point where the thrust transmitting bearing unit 32 first makes contact with the lever ends 36. Inasmuch as the pressure of the fluid present within the pipe section 70 also acts upon the disk member 83, and since the disk member 83 is against the lower stop ring 82, the bellows 72 contracts by compression of the spring 74. Consequently the cone surface 77 of the valve member 76 moves out of seating engagement with the frusto-conical surface 69 and allows fluid under pressure from the pipe section 70 to enter into the interior 67 directly as shown in Figure 3. The rise in pressure is rapid from the point where the thrust transmitting bearing unit 32 first makes initial contact with the terminal ends 36 of the clutch release lever 17 as shown in Figure 2 to the clutch fully released position shown in Figure 3. Figure 4 graphically illustrates the pressure within the chamber 29 and the position of the piston 30 when the thrust transmitting bearing unit 32 first engages the lever ends 36 and the cone surface 77 of the valve member 76 is just commencing to move away from the frusto-conical surface 69, and that point is illustrated by the intersection of a vertical broken line 88 and the curve. When the operator removes his foot from the clutch pedal 48 the pressure of the fluid within the chamber 29 is relieved and the operational sequence is reversed. The clutch engaging springs 16 and the springs 51 act in unison to return the drive and driven elements of the clutch assembly 10 into driving engagement and to effect movement of the piston 30 to the left, as viewed in Figure 3. The resilient action of the clutch engaging springs 16 continually act upon the piston 30 until the inner ends 36 of the clutch release lever 17 are in positions corresponding to their clutch fully engaged positions, which positions are determined by the amount of wear of the clutch facing of the clutch drive and driven elements. At the instant the operator removes his foot from the clutch pedal 48 fluid flows directly from the interior space 67 and thus the chamber 29 to the pipe section 70 inasmuch as the frusto-conical surface 69 is out of seating engagement with the cone surface 77 but is commencing to move toward the cone surface 77. Fluid continues to flow directly from the interior space 67 to the pipe section 70 until the inner ends 36 of the clutch release lever 17 shown in Figure 5 are in positions corresponding to the clutch fully engaged position and the outer bearing race 35 is just moving out of contact therewith and the surfaces 69 and 77 are just moved into engagement with each other. During this operational phase of the clutch engaging operation the fluid pressure within the chamber 29 drops rapidly, as illustrated in Figure 4. Obviously, when the thrust transmitting bearing unit 32 moves to the left out of contact with the terminal ends 36 of the clutch release levers 17 the resilient action of the springs 16 is no longer acting upon the piston 30 and as a result the pressure of the fluid within the chamber 29 drops, but not at the rapid rate at which it dropped during the time when the clutch pedal 48 was released by the vehicle operator and the clutch release levers 17 were still in engagement with the thrust transmitting bearing unit 32. At this point on the curve of Figure 4, which corresponds to the line 88, the pressure within the chamber 29 and also within the interior 67 of the pressure responsive device 56 acting upon the bellows 72 is insufficient to maintain the bellows in their contracted or collapsed state. Thus at this point on the curve of Figure 4 where the vertical line 88 intersects the curve, the cone portion 77 of the valve member 76 is moved into full seating engagement with the frusto-conical surface 69 to disrupt direct fluid communication between the interior 67 of the pressure responsive device 56 and the pipe section 70, as illustrated in Figure 5. It will be noted that the disk member 83 is against the lower stop ring 82 when the system is in this condition. It will be appreciated that further movement of the piston 30 to the left from the position shown in Figure 5 can only be effected by displacing fluid from the fluid receiving chamber 29. Since the valve member 76 is in its closed position whereby direct fluid communication between the pipe section 70 and the interior 67 of the pressure responsive device 56 is disrupted, only that volume of fluid within the valve member 76 between the upper surface 86 of the disk member 83 and the upper stop ring 81 can be displaced from the pressure receiving chamber 29 by movement of the disk member 83 from the position shown in Figure 5 to the position shown in Figure 6. The volume of the space defined by the upper surface 86 of the disk member 83 when in its lowered position and the bottom surface 85 thereof is abutting the lower stop ring 82 the upper stop ring 81 and the interior surface 78 of the valve member 76 is chosen such that that amount of fluid is displaced from the valve member 76 the piston 30 will have moved to the left as viewed in Figure 5 away from engagement with the terminal ends 36 of the clutch release lever 17 an amount equal to the ideal clearance 55, as shown in Figure 6. The spring 51 acting upon the piston 30 provides the necessary fluid pressure above atmospheric pressure for moving the disk member 83 upwardly against the upper stop ring 81 to displace the predetermined volume of fluid from the valve member 76. It will be appreciated that the disk member 83 serves as a means for limiting the retroactive movement of the piston 30 away from the inner terminal ends 36 of the clutch release lever 17. The volume of displaced fluid from the interior of the valve member 76 determines the axial clearance between the lever ends 36 and the bearing unit 32 and the volume of the displaced fluid depends upon the diameter of the interior surface 78 of the valve member 76 and the spacing of the upper stop ring 81 and the upper surface 86 of the disk member 83 when in its lower position and the lower surface 85 thereof is abutting the lower stop ring 82. From the foregoing it will be appreciated that regardless of the positions of the inner terminal ends 36 of the clutch release lever 17 resulting from the condition of the friction facing materials of the clutch drive and driven elements with respect to fixed parts of the clutch actuating device, a predetermined axial clearance between the inner terminal ends 36 of the clutch release levers 17 and the outer bearing race 35 of the thrust transmitting bearing unit 32 is always maintained when the clutch is in its fully engaged position.

The embodiment of the invention chosen for the purposes of description and illustration herein is that preferred for achieving the objects of the invention and developing a utility thereof in the most desirable manner, due regard being had to existing factors of economy, simplicity of design and construction and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A fluid flow controlling device comprising a casing having a fluid containing chamber, a reversible flow inlet passage communicating with said chamber, a reversible flow outlet passage communicating with said chamber, the inlet passage having a valve seat facing inwardly of the chamber, a valve member retractably seated upon the valve seat having a fluid expansion bore communicating at one end with said chamber and communicating at its other end with said inlet passage, a plunger freely reciprocal within said bore in a sealed relation, a compression spring reacting between the casing and the valve member to urge the latter seated, and an expansible and retractable housing for said spring communicatively isolating the same from the chamber and operable in response to the pressure of fluid in the chamber for compressing the spring and holding the valve member unseated.

2. A fluid flow controlling device comprising a casing having a fluid containing chamber, a reversible flow inlet passage communicating with said chamber, a reversible flow outlet passage communicating with said chamber, the inlet passage having a valve seat facing inwardly of the chamber, a hollow valve member retractably seated upon the valve seat, said valve seat and valve member having tapered complementary seating faces, a plunger freely reciprocable within said valve member in a seated relation, means for subjecting one side of said plunger to the pressure of fluid in said chamber, means for subjecting the other side of said member to the pressure of fluid in said inlet passage, a compression spring reacting between the casing and the valve member to urge the latter seated, and an expansible and retractable housing for said spring communicatively isolating the same from the chamber and operable in response to the pressure of fluid in the chamber for compressing the spring and holding the valve member unseated.

3. A fluid flow controlling device comprising a casing having a fluid containing chamber, a reversible flow inlet passage communicating with said chamber, a reversible flow outlet passage communicating with said chamber, the inlet passage having a valve seat facing inwardly of the chamber, an elongated hollow valve member retractably seated upon the valve seat, one end of said valve member and said valve seat having tapered complementary seating faces, a plunger freely reciprocable within said valve member in a sealed relation, a central port extending through said valve member in alignment with said inlet passage for establishing fluid communication between said inlet passage and one side of said plunger, means for subjecting the other side of said plunger to the pressure of fluid in said chamber, a compression spring reacting between the casing and the end of the valve member remote from the tapered seating face end thereof, and an expansible and retractable housing for said spring communicatively isolating the same from the chamber and operable in response to the pressure of fluid in the chamber for compressing the spring and holding the valve member unseated.

4. A fluid flow controlling device comprising a casing having a fluid containing chamber, a reversible flow inlet passage communicating with said chamber, a reversible outlet passage communicating with said chamber, the inlet passage having a valve seat facing inwardly of the chamber, a valve member retractably seated upon the valve seat having a fluid expansion bore communicating at one end with said chamber and communicating at its other end with said inlet passage, a plunger freely reciprocable within said bore in a sealed relation, spaced stop means carried by said valve member within said bore and engageable by said plunger for limiting the reciprocal movement of said plunger within said bore, and a compression spring reacting between the casing and the valve member to urge the latter seated.

5. A fluid flow controlling device comprising a casing having a fluid containing chamber, a reversible flow inlet passage communicating with said chamber, a reversible outlet passage communicating with said chamber, the inlet passage having a valve seat facing inwardly of the chamber, a hollow valve member retractably seated upon the valve seat, said valve seat and valve member having tapered complementary seating faces, a plunger freely reciprocable within said valve member in a sealed relation, stop means carried by said valve member for limiting reciprocal movement of said plunger with respect to said valve member, means for subjecting one side of said plunger to the pressure of fluid in said chamber, means for subjecting the other side of said member to the pressure of fluid in said inlet passage, and a compression spring reacting between the casing and the valve member to urge the latter seated.

6. A fluid flow controlling device comprising a casing having a fluid containing chamber, a reversible flow inlet passage communicating with said chamber, a reversible outlet passage communicating with said chamber, the inlet passage having a valve seat facing inwardly of the chamber, an elongated hollow valve member retractably seated upon the valve seat, one end of said valve member and said valve seat having tapered complementary seating faces, a plunger freely reciprocable within said valve member in a sealed relation, a central port extending through said valve member in alignment with said inlet passage for establishing fluid communication between said inlet passage and one side of said plunger, stop means carried by said valve member for limiting relative reciprocal movement of said plunger with respect to said valve member, means for subjecting the other side of said plunger to the pressure of fluid in said chamber, and a compression spring reacting between the casing and the end of the valve member remote from the tapered seating face end thereof.

7. A fluid flow controlling device as set forth in claim 6 and further including an expansible and retractable housing for said spring communicatively isolating the same from the chamber and operable in response to the pressure of fluid in the chamber for compressing the spring and holding the valve member unseated.

References Cited in the file of this patent
UNITED STATES PATENTS

| | | |
|---|---|---|
| 2,385,625 | Hopmans | Sept. 25, 1945 |
| 2,571,963 | Stelzer | Oct. 16, 1951 |
| 2,593,192 | Rockwell | Apr. 15, 1952 |